Figure 1:
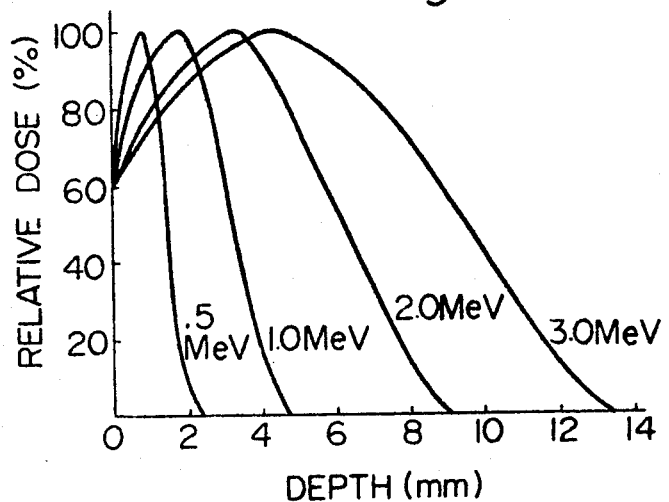

United States Patent [19]
Takahashi et al.

[11] 3,719,541
[45] March 6, 1973

[54] PROCESS FOR THE PRODUCTION OF PRECOATED METAL

[75] Inventors: Masao Takahashi; Jiro Mibae; Takamitsu Ino; Ryuhei Takigawa; Shuji Fujioka, all of Ohtsu, Japan

[73] Assignee: Toray Industries, Inc., Tokyo, Japan

[22] Filed: March 9, 1970

[21] Appl. No.: 17,643

[30] Foreign Application Priority Data

March 11, 1969 Japan ................................. 44/18027

[52] U.S. Cl. ................. 156/272, 161/216, 161/252, 204/159.15
[51] Int. Cl. ............................................. B01j 1/10
[58] Field of Search .... 156/272; 204/159.15, 159.14; 161/188, 216, 252

[56] References Cited

UNITED STATES PATENTS

| | | |
|---|---|---|
| 3,261,336 | 8/1965 | Magat et al..................204/159.15 X |
| 3,201,336 | 4/1966 | Burlant.......................204/159.15 X |
| 3,520,714 | 7/1970 | Miller.........................204/159.15 X |
| 3,157,560 | 11/1964 | Livingston et al. ..........204/159.15 X |
| 3,437,513 | 4/1969 | Burlant et al...............204/159.15 X |
| 3,542,587 | 11/1970 | Aronoff et al..............204/159.15 X |
| 3,252,880 | 5/1966 | Magat et al..................204/159.15 X |
| 3,081,244 | 3/1963 | Campanile ............................156/272 |
| 3,287,197 | 11/1966 | Errede...................................156/272 |

Primary Examiner—Carl D. Quarforth
Assistant Examiner—E. E. Lehmann
Attorney—Sherman and Shalloway

[57] ABSTRACT

Process for the production of a precoated metal which comprises laminating a film resin layer on the surface of a metal material through an intermediate layer comprising a radical curable resin and achieving unification of said laminated product by irradiating said laminated product from above with an electron beam having an energy capable of being transmitted to the surface of the metal material.

2 Claims, 2 Drawing Figures

PROCESS FOR THE PRODUCTION OF PRECOATED METAL

This invention relates to a pronoucedly improved process for the production of a precoated metal possessing excellent properties.

In recent years the production of the precoated metals tends to be increased to a great degree. This is because the precoated metal as a material coated or covered at a stage prior to processing renders capable of a substantially rationalized process for the manufacture of metal wares as compared with the conventional process of coating after processing such as press work. The precoated metals concurrently have an effectiveness for preventing from tarnishing the metal plate in storage and during the time of transportation.

For such a process for the manufacture of the precoated metal it is a most customary method that a paint is coated on the surface treated metal plate by some suitable means, followed by heating at elevated temperatures and drying whereby during it.

There are other methods available such that a thin film is caused to be adhered to at the elevated temperatures or adhered in layers through an adhesive agent layer.

Since the precoated metals are mainly used outside the house including roofing materials and side panels of the house, weather-proof characteristics and anti-corrosive property are required of the precoated metals. To meet this situation the so-called two coats has been recently developed, i.e., the precoated metal is coated twice with paints with a view of causing the undercoating to contribute for giving an intimate adhesive property with respect of the metal and anti-corrosive property and the top coating for giving processability and weather-proof property. However, satisfactory results have not as yet been achieved.

An object of the present invention is to provide a novel process for the production of a new precoated metal capable of having excellent characteristics over the precoated metals available on the market concerning various properties (weather-proofness, anti-corrosiveness, processability, etc.) necessary for a precoated metal, the said process is substantially rationalized as compared with the hitherto process of the manufacture.

Other objects of the present invention will be evident from the below-mentioned description.

It has been found out that these objects of the present invention can be achieved by laminating in layers a film resin layer on the surface of a metal material through an intermediate layer comprising a radical curable resin, the said laminated material being irradiated from above it by the electron beam having an energy for transmitting onto the surface of the metal material.

In the present invention, for metal materials consisting of a substrative material there are used various types of iron sheets (for example, untreated bare sheet steel, zinc steel sheet, zinc phosphate treated sheet steel, metal plates in the form of a thin sheet such as aluminium sheet, copper sheet and metal materials in a variety of forms such as a rod, wire and mass.

Flat surface is a surface, widely used for forming a laminated construction and other various forms including curved surface and wavy shaped surface may also be used. Further, it is possible to cause a resin layer andpaint film layer to exist on the surfaces of these metal materials within the range of the objects of the present invention. This is a thin paint film known as service coat, anti-rust paint, etc. and is considered en bloc with respect of the metal material.

For materials forming the intermediate layer, i.e., radical curable resins, there are named (1) a vinyl polymer containing unsaturated groups at its side chains, (2) an unsaturated polyester prepared by using as one of starting materials an unsaturated monocarboxylic acid or unsaturated dicarboxylic acid, (3) an unsaturated polyester ether (an epoxy ester) prepared by the condensation of an unsaturated carboxylic acid and an epoxy resin, (4) a melamine polymer containing an unsaturated group (for example, a condensation product of hydroxy alkyl methacrylic acid ester and melamine), (5) an unsaturated polyamide prepared by using as one of starting materials an unsaturated monocarboxylic acid or unsaturated dicarboxylic acid and (6) a mixture of each of the said unsaturated polymers and vinyl monomers. The amount of the unsaturated groups contained in these unsaturated polymers varies in a considerably wide range depending upon the properties required of the precoated metal. However, in general, favorable results are obtained in the case of 0.1 to 5, especailly 0.2 to 1.5, mole equivalent per 1,000 of the molecular weight of a polymer. The preferred blend ratio of the unsaturated polymer and the vinyl monomer is 30–100 by weight percent to 70–0 by weight percent.

A mixture of vinyl monomers and a polyurethane prepared by using as a starting material an acid, alcohol, polyether or polyester containing an unsaturated groups can also be used in this invention as a radical curable resin forming the intermediate layer.

Moreover, in this invention, a mixture of a saturated polymer and unsaturated monomers such for example as a mixture, say, the so-called acrylic sirup, of a methyl methacrylate polymer and methyl methacrylate monomer can be used as the radical curable resin.

For vinyl monomers to be used in the present invention there are named acrylic acid; acrylates such as methyl acrylate, ethyl acrylate, butyl acrylate, cyclohexyl acrylate, octyl acrylate and hydroxyethyl acrylate; methacrylic acid; methacrylates such as methyl methacrylate, ethyl methacrylate, butyl methacrylate and hydroxyethyl methacrylate; acrylic amide; acrylic amide derivatives such as N,N-dimethyl acrylic amide, N-n-butoxycarbonyl acrylic amide; methacrylic amide; methacrylic amide derivatives such as methacrylic amide, N,N-dimethyl methacrylic amide, N-o-anisyl methacrylic amide; vinyl esters such as vinyl acetate, vinyl-p-chlorobenzoate, and vinyl pelargonate; itaconic acid; itaconic acid esters such as diethyl itaconate; maleic acid; maleic acid esters such as diethyl malate; allyl esters such as allyl stearate and methallyl laurate; vinyl ketones such as methyl-α-methyl vinyl ketone; vinyl ethers such as n-hexyl vinyl ether, stearyl vinyl ether; styrene; styrene deviratives such as p-chlorostyrene, α-methyl styrene; olefine derivatives such as 3-methyl-vinyl cyclohexane and 4-phenyl-1-butene; halogenated ethylene such as 1-chloro-1,2-dibromo-ethylene; acrylonitrile; methacrylonitrile; silane derivatives such as allyl trichlorosilane and chloro-dimethyl-vinyl silane, etc.

An anti-corrosive pigment can be incorporated in the radical curable resin forming the intermediate layer with a view to giving anti-corrosive property to the metal material. Further, various types of pigments, fillers, dispersing agents, plasticizers and other additives used for various purposes can be incorporated for a plurality of objects including coloring and hiding effects. Ratios of these substances in the composition vary over a wide range according to the properties necessary for the intended final product.

According to the process of the present invention, it is necessary to use the radical curable resin in the absence of a solvent. The presence of any of solvent is not allowed because of causing the adhesive property to be lowered and preventing the surface from being covered uniformly.

As for the film resin layer to be overlaid on the intermediate layer comprising the radical curable resin, substances in the form of a film comprising various types synthetic resins are used. Any type of such resin can be used so long as it can provide satisfaction for the properties required in accordance with the use as a precoated metal. Most preferable are (1) acrylic film prepared by melt extruding from a polymer composition containing at least 50 by weight percent of ester acrylate or ester methacrylate and by applying other means, (2) a polyester film obtained by for example melt extruding a polyester prepared from starting materials of a polyethylene terepthalate or a polyester comprising of terephthalic acid and ethylene glycol for the main components. (3) a vinyl chloride resin film prepared by melt extruding from a vinyl chloride resin consisting predominantly of vinyl chloride and by applying other means, (4) a fluoropolymer resin film prepared by melt extruding from a vinylidene fluoride resin consisting predominantly of a vinylidene fluoride and by applying other means and so forth. No any specific restrictions are made with respect of means for forming the films as far as these films of the present invention possess a property sufficient enough to meet the request of the precoated metal.

In order for these films to form a surface layer of a laminated construction and to give a variety of properties (weather-proofness, surface hardness, anti-corrosiveness, processability, decorativeness, etc), as the case may be, various types of pigments, fillers, dispersing agents, plasticizers and other additives for a plurality of purposes are incorporated.

In the present invention, specifically excellent results can be brought forth in the case of using a resin forming the surface layer and a resin forming the intermediate layer, each containing the same monomer constituent. For example, if a polyester film is used for the surface layer when an unsaturated polyester type resin is used as the intermediate layer, a good result can be achieved.

As for the method for forming a laminated structure, there are various methods available and no specific restrictions are imposed thereon. For example, it is possible to conduct in such a manner that on the surface of the substrative metal material, the radical curable solventless resin layer is formed by the customary film forming means including by spraying, blushing, melt-coating, electrodeposition process, etc. and by other various means, followed by laminating a film as the surface layer thereon. It is also possible to conduct in such a manner for example that the radical curable non-solvent resin layer is formed at the back face of the film forming the surface layer and thereafter, laid in layers with the metal material.

According to the process of the present invention, by irradiating the electron beam on the thus obtained laminated construction from above the film, the radical curable resin layer is cured and concurently the substrative material and the film are intimately adhered to each other and unified. So far as the electron beam is concerned, there are used any of the electron beams discharged from various types electron beam accelerators such as cockcroft type accelerator, cockcroft Walton type accelerator, Van de Graff type accelerator, resonant transformer type accelerator, insulating core transformer acclerator, linear accelerator type accelerator, dynamitron type accelerator, high frequency type accelerator and the like. Normally, the object of the present invention can be achieved by giving a dose of 0.1–20 Mrad, preferably 0.5–10 Mrad with the electron beam having an acceleration energy of 0.1 to 3 MeV.

In the present invention, the total thickness of the film layer and the radical curable resin layer is subjected to the restriction by the maximum transmission distance of the electron beam. For example, in the case of a material having a density of 1 g/cm$^3$, the maximum transmission distance of the electron beam having an energy of 3 MeV is 13.5 mm and consequently, the total thickness should not exceed 13.5 mm. Now that the density and the maximum transmission distance are in a relation of inverse proportion, the total thickness will will be made thicker than 13.5 mm when the density is less than 1 g/cm$^3$.

Figure 2:
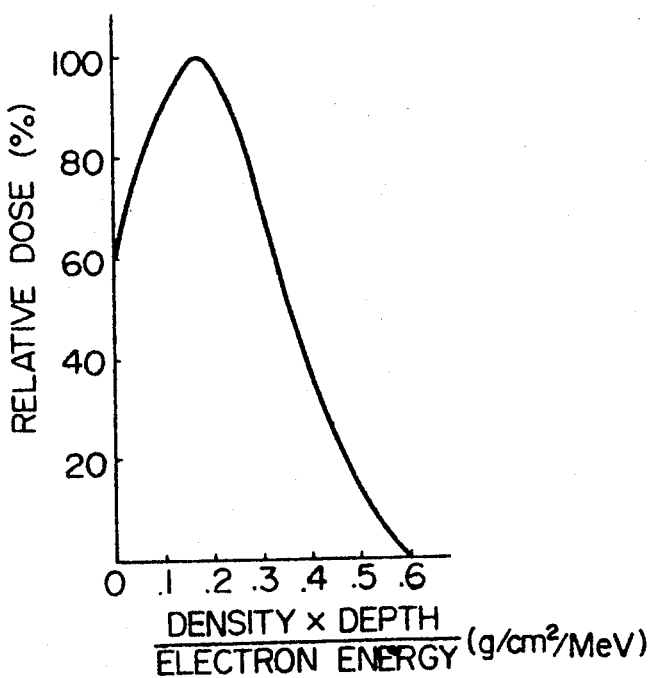

Each of the attached drawings FIG. 1 and FIG. 2 is a dose-depth curve graph with a view of giving an explanation of the principle of the present invention.

FIG. 1 shows a relation between the depth of a material having a density of 1 g/cm$^3$ in the case of the high energy electron beam passing therethrough and the absorbed enery imparted by the electron beam. According to this figure it is found out that the absorbed energy on the surface of the material (depth = 0) is only 60 percent of the maximum absorbed energy. Namely, in the case of the electron beam having an energy of 1.0 MeV, for example, the maximum amount of absorption is indicated in the zone of 1.8 mm in depth from the surface and the amount of absorption in the surface zone is about 60 percent of the maximum.

FIG. 2 is a graph showing the generalization of FIG. 1 and it is seen therein that the amount of energy absorption becomes maximum in the zone of some depth from the surface.

Consequently, in the present invention, the maximum available efficiency of energy and the improved cure speed can be obtained by using this principle as long as the radical curable resin layer is positioned in the zone of some depth showing the maximum amount of absorption.

As well known, the radical curable resin is withheld from conducting the curing reaction by oxygen in the air being a radical inhibitor. According to the process of the present invention, the film is laid on the upper layer thereby blocking the air and achieving the effect of removing its radical prohibiting work.

Furthermore, in the present invention, in the case where the intermediate layer contains a radical reactive monomer (for example vinyl monomer such as styrene and methyl methacrylate), these monomers can be effectively prevented from evaporation.

As for the process for the manufacture of the precoated metal it is the hitherto used method that the laminated construction is formed by causing acrylic film, vinyl chloride, resin film or fluoropolymer to adhere by heat to the metal material in the condition as they are or through the thermoadhesive layer. However, in this case, a single-layer construction is formed by means of adhesion of the independent film by pressure at the elevated temperatures and hence, in general, intimate adhesiveness, anti-corrosiveness, process ability are not sufficient. Almost all of the films have a base of thermo-plastic resin formed into a film by melt extrusion and consequently, the hardness is not satisfactory.

With view of improving such deficient properties of the film it is customarily conducted that the undercoating is generally, made to the metal material thereby imparting it a role for contributing to the intimate adhesion, anticorrosiveness or plural laminated film is made by covering the film thereby imparting it the same role as abovesaid. In the case of giving the undercoating to the metal material, it is usual to dry and cure it at the elevated temperatures after coating with the undercoating paint. If the drying and curing are not sufficient, the remaining solvents or substances originated from the curing are caused to swell from their escape after the completion of covering the film and it give rise to blister and causes the film to come off. The same thing will be said in the case of coating the intermediate layer onto the film. When the film or metal material is melt-coated with the thermo-plastic intermediate layer, there are no problems as above described. However, in this case, the intermediate layer is made thermo-plastic whereby not a few deficiencies are seen in such important properties as anti-corrosiveness, solvent-resistance property and intimate adhesive property.

On the contrary, according to the present invention, the intermediate layer is cured by irradating the electron beam to the laminated construction whereby forming a cured resin having the necessary properties and concurrently obtaining an adhesiveness between the film and the substrative material. This is the effect that has never been brought forth by the melt-adhesion process. Further, it is another pronounced characteristic that by means of the electron beam the film layer is cured, for instance, by crosslinking, and in most cases, the deficient hardness of the film layer consisting of thermo-plastic resin can be improved by crosslinking.

The present invention will be explained in particulars by the following Examples.

EXAMPLE 1

A film of $20\mu$ in thickness was produced by melt extruding at 2500° C a composition consisting of 70 parts of a copolymer of methyl methacrylate-ethyl acrylate-methacrylic acid (the weight ratio of 70/28/2), 15 parts of titanium oxide white, 7 parts of phthalocyanine blue, 7 parts of chrome yellow and 0.2 part of carbon black. (film$_I$).

A composition consisting of methyl methacrylate-ethyl acrylate-methacrylic acid(the weight ratio of 40/57/3) was melt-extruded by 250° C on the surface of the film 1 and covered in the thickness of $5\mu$ thereby producing a composite film with a thickness of $25\mu$. (film II)

The below-described composition was coated in the thickness of $5\mu$ on the surface of a zinc phosphate treated sheet steel (0.3 mm thick).

This composition is a liquid composition having a viscosity of 10 poise (3°C) consisting of 70 parts by weight of a polymer containing an unsaturated group at its side chain obtained by reacting a copolymer of ethylacrylate-acrylic acid (85 parts/15 parts by weight) with 10 parts by weight of glycidyle methacrylate, 30 parts by weight of methyl methacrylate and 25 parts by weight of zinc chromate.

After coating this composition in the thickness of $5\mu$ as above described, the film (I) was covered thereon and 3 Mrads of 0.5 MeV electron beam was irradiated from above the film by means of the Van de Graaff type accelerator. The obtained precoated sheet steel was subjected to the various ASTM tests as shown in Table I.

Further, the film (II) was bonded at 1300°C to the surface of the zinc phosphate treated sheet steel (0.3 mm thick) with the said covered layer downwardly whereby a laminated sheet steel was made which was subjected to various similar tests.

TABLE 1

|  | Precoated Metal by electron beam curing method | by film laminating method |
|---|---|---|
| Pencil hardness (JIS G3312, NCCA No.11–12 | 3H | F |
| "Cross hatched"-tape test (JIS G3312) | 100/100 | 100/100 |
| "Cross hatched"-Ericksen-tape-test (6 mm) (JIS G3312) | 100/100 | 70/100 |
| 180°C bend (JIS G3312) | 0T (OK) | 1T |
| Impact test (1 kg × 50 cm) (JIS G3312) | pass | pass |
| Salt spray test (5% NaCl aqueous solution, 500 hus.) (JIS Z2371) | normal | caused swelling |

In the case of the precoated metal by means of the electron beam curing method, the intermediate layer between the film and the sheet steel is not only sufficiently cured during a short period of time, but good physical properties as shown in Table I are obtained because of an intimate adhesion between them. Further, in this case it is worth attracting a special attention that the obtained hardness is of such a sufficient degree that was not obtained by the mere lamination of the thermoplastic acrylic films. It is assumed that this is because the electron beam irradiation resulted in cross-linking of the upper acrylic film. It is evident that by the occurence of such cross-linkages the precoated metal is concurrently given better resistances to solvent, stains and chemicals.

EXAMPLE 2

A film with a thickness of $25\mu$ was produced by melt extruding at 280°C a composition consisting of 70 parts of polyethylene terephthalate maleate (terephthalate/maleate = 7/3 mol ratio), 23 parts of titanium oxide white and 7 parts of phthalocyanine blue.

0.3 mol of styrene was mixed with an unsaturated polyester produced from 0.5 mol of phthalic acid, 0.3 mol of terephthalic acid, 0.2 mol of maleic acid and 1.1 mols of ethylene glycol. 100 parts of this composition was combined with 7 parts of zinc chromate, 20 parts of iron oxide and 3.5 parts of zinc oxide thereby producing a paint.

The above described paint was coated in the thickness of $5\mu$ on the surface of the zinc phosphate treated sheet steel and the said polyester film was covered thereon and 4 Mrad of the 0.3 MeV electron beam was irradiated. This caused the film and the sheet steel to be unified whereby a precoated metal was obtained.

Its properties were such as shown in Table 2.

Table 2

| | |
|---|---|
| Pencil Hardness | 3H |
| "Cross hatch"-Erickson-tape test (6 mm) | 100/100 |
| 180°C bend | 1T |
| Impact test (1 kg × 50 cm) | pass |
| Salt spray test (5% NaCl aqueous solution, 500 hrs.) | normal |

EXAMPLE 3

A film with a thickness of $20\mu$ was produced by melt-extruding a composition consisting of 85 parts of polyvinyl chloride, 15 parts of dioctyl phthalate, 15 parts of titanium oxide white and 7 parts of phthalocyanine blue.

A polymer having a double bond at its side chain was produced by reacting a copolymer consisting of 0.7 mol of vinyl chloride, 0.2 mol of ethyl acrylate and 0.1 mol of acrylic acid with 0.1 mol of glycidyl methacrylate and a syrup consisting of 70 parts of this polymer, 30 parts of methyl methacrylate, 17.5 parts of zinc chromate, 8 parts of talc and 6.8 parts of zinc oxide was produced.

The said syrup was coated on the zinc phosphate treated sheet steel in the thickness of $5\mu$ and the said film was covered thereon and by giving it a dose of 4 Mrad radiation of the 0.3 MeV electron beam, a precoated metal was produced. The obtained precoated metal achieved good results in the adhesive property, weathering property and anti-corrosive property.

The physical properties of the precoated metal are given in Table 3.

Table 3

| | |
|---|---|
| Pencil hardness | F |
| "Cross hatch"-tape test | 100/100 |
| "Cross hatch"-Ericksen (6mm)-tape test | 100/100 |
| 180° Bend | 1T |
| Impact test (1 kg × 50 cm) | pass |
| Salt spray test (500 hrs) | excellent |

Example 4

A zinc phosphate treated zinc sheet steel was coated in the thickness of $3\mu$ with an acrylic acid ester as a service coat and cured. Thereafter, this metal material was coated in the thickness of $5\mu$ with the liquid composition of Example 3, followed by covering it with the acrylic film I of Example 1 and by giving it a dose of 4 Mrads radiation of 0.5 MeV electron beam by means of the Van de Graaff, a precoated metal excellent in close adhesive property was obtained.

The physical properties of the precoated metal are shown in Table 4.

Table 4

| | |
|---|---|
| Pencil hardness | H |
| "Cross hatch"-tape test | 100/100 |
| 180°C bend | 1T |
| Impact test (1 kg × 50 cm) | pass |
| Salt spray test (500 hrs.) | excellent |

Example 5

An aluminum sheet was coated in the thickness of $5\mu$ with the liquid composition of Example 3 and then covered with the acrylic film of Example I, followed by giving it a dose of 4 Mrads radiation of 0.5 MeV electron beam by means of the Van de Graaff, whereby a precoated colored aluminum plate excellent in physical properties including the close adhesive property was obtained.

The physical properties of the precoated plate are given in Table. 5.

Table 5

| | |
|---|---|
| Pencil hardness | 2H |
| "Cross hatch"-Ericksen-tape test (6 mm) 100/100 | |
| 180°C bend | 0T |
| Impace test (1 kg × 40 cm) | pass |
| Salt spray test (500 hrs.) | normal |
| Accelerated weathering (JIS Z0230) | weather-O-meter 1000 hrs. luster retaining ratio: more than 85% |

Example 6

The following composition was coated in the thickness of $5\mu$ on the surface of the zinc phosphate treated sheet steel (0.3 mm thick).

This composition is a liquid composition having a viscosity of 10 poises (23°C) consisting of 70 parts by weight of a polymer containing an unsaturated group at its side chain obtained by reacting 100 parts by weight of a copolymer of methyl methacrylate-butyl acrylate-glycidyl methacrylate (the weight ratio of 30/55/15) with 15 parts by weight of methacrylic acid, 10 parts by weight of methyl mechacrylate, 20 parts by weight of butyl acrylate and 25 parts by weight of zinc chromate.

After coating this composition as above described, the below-mentioned film was covered thereon and 5 Mrads of the 0.5 MeV electron beam was irradiated by means of the Van de Graaff type accelerator.

The said film is a film with a thickness of $20\mu$ obtained by shaping a polymer containing an unsaturated group at its side chain obtained by reacting 100 parts by weight of a copolymer of methyl methacrylate-butly acrylate-glycidyl methacrylate (the weight ratio of 30/65/5) with 5 parts by weight of methacrylic acid and 50 parts by weight, based on said polymer, of titanium oxide.

The physical properties of the obtained precoated sheet steel were shown in Table 6.

Table 6

| | |
|---|---|
| Pencil hardness | H |
| "Cross hatch"-tape test | 100/100 |
| "Cross hatch"-Ericksen-tape test (6 mm) | 100/100 |
| 180°C bend | 0T |
| Impact test (1 kg × 50 cm) | pass |
| Salt spray test (5% NaCl aqueous solution, 500 hrs.) | normal |
| Accelerated weathering (JIS Z 0230) | weather-O-meter 600 hrs. reduction in luster: 5% |

Example 7

The identical liquid composition as in Example 6 was coated in the thickness of 6 μ on the iron phosphate treated sheet steel (0.18 mm thick) and the below-mentioned film was covered thereon and a dose of 5 Mrads radiation of 0.3 MeV electron beam was irradiated.

The said film is a film with a thickness of 20μ obtained in such a manner that a xylene-butanol (the weight ratio of 1/1) solution of a 8:2 (weight ratio) mixture of a polymer of methyl methacrylate-ethyl acrylate-hydroxyethyl methacrylate-acrylic acid (the weight ratio of 30/55/10/5) and hexamethoxymethylated melamine was cast on a polypropylene plate and heated to be cured and thereafter peeled off.

The physical properties of the obtained precoated sheet steel were shown in Table 7.

Table 7

| | |
|---|---|
| Pencil hardness | 2H |
| "Cross hatch"-Ericksen-tape test (6 mm) | 100/100 |
| 180° bend | 2T |
| Impact test (1 kg × 40 cm) | pass |
| Salt spray test (5% NaCl aqueous solution, 500 hrs.) | normal |

Example 8

An unsaturated polyester was prepared from 0.3 mol of phthalic acid, 0.6 mol of terephthalic acid, 0.1 mol of maleic acid and 1.1 mols of ethylene glycol and mixed with 0.1 mol of styrene. A paint was produced by combining 100 parts of this composition with 6 parts of zinc chromate, 25 parts of iron oxide and 3.5 parts of zinc oxide.

On the other hand, a film with a thickness of 20μ was obtained by melt extruding at 280°C a composition consisting of 70 parts of polyethylene terephthalate, 23 parts of titanium oxide white and 7 parts of phthalocyanine blue.

The said paint was coated in the thickness of 7μ on the zinc phosphate treated sheet steel and the said polyester film was covered thereon and gave it a dose of 6 Mrads radiation of the 0.3 MeV electron beam whereby a precoated metal integrated with the paint and sheet steel was obtained.

The physical properties of the precoated metal are given in Table 8.

Table 8

| | |
|---|---|
| Pencil hardness | 3H |
| "Cross hatch"-tape test | 100/100 |
| 180° bend | 1T |
| Impact test (1 kg × 50 cm) | pass |
| Salt spray test (500 hrs.) | excellent |

Example 9

A 30β thick film was produced from a n-butanol-xylene solution (having 30 parts by weight of $TiO_2$ relating to the resin) of 70 parts by weight of alkyd resin consisting of 43 percent of phthalic acid, 20 percent of glycerin and 36 percent of capric acid and 30 parts by weight of n-butylated methylolated melamine.

A mixture of 20 parts of styrene and 80 parts of an unsaturated polyester obtained through conducting the heat-condensation of 0.6 mol of phthalic acid, 0.3 mol of maleic acid, 0.1 mol of methacrylic acid, 0.7 mol of glycerin and 0.3 mol of ethylene glycol in the presence of 200 ppm of hydroquinone as a polymerization inhibitor was coated on the surface of zinc phosphate treated sheet steel (0.3 mm thick) in the thickness of 10μ. The said film was laid thereon and 5 Mrads of 0.5 MeV electron beam was irradiated thereon by means of the Van de Graaff type accelerator. The obtained precoated sheet steel was excellent in adhesive property and in processability.

Table 9

| | |
|---|---|
| Pencil hardness | H |
| "Cross hatch"-type test | 100/100 |
| 180° bend | 2T |
| Impact test (1 kg × 50 cm) | pass |
| Salt spray test (500 hrs.) | very good |

Example 10

The condensation of 340 parts of trimethylol propane and 300 parts of isophthalic acid was conducted by heating to 220°C for 2 hours. The obtained polyester was cooled to 130°C and added thereto were 700 parts of partial hydrolyzed substances of phenyl methyl dimethoxysilane, 3 parts of isopropyl titanate and 800 parts of cellosolve acetate. The condensation was conducted by heating for one hour. A paint was made by adding to the obtained solution 80 parts of $TiO_2$ per 100 parts of the resin constituent in the said solution and it was coated on the surface and heated to be cured thereby obtaining a film.

0.2 mol of styrene was added to a polyester obtained by conducting the condensation of 0.7 mol of isophthalic acid, 0.3 mol of maleic acid, 0.6 mol of trimethylol propane and 0.2 mol of ethylene glycol by heating to 130°C. to 240°C for 5 hours. The resultant solution was coated in the thickness of 10μ on the iron phosphate treated sheet steel and the said film was covered thereon and by giving it a dose of 5 Mrads radiation of 0.3 MeV electron beam, an unified precoated metal was obtained. This material was good both in the adhesiveness of the covered layer and processability.

The physical properties of the precoated metal are given in Table 10.

Table 10

| | |
|---|---|
| Pencil hardness | 2H |
| "Cross hatch"-tape test | 100/100) |
| 180° bend | 2T |
| Impact test (1 kg × 50 cm) | pass |
| Salt spray test (500 hus.) | excellent |

Example 11

100 parts by weight of finely powdered polyvinyl chloride polymer a molecular weight of 300,000, 20 parts by weight of dioctyl adipate, 50 parts by weight of bis-phenol A-epichlorohydrin type epoxy resin (molecular weight:900, epoxy equivalent: 450), 8 parts by weight of β-napthylamine and 100 parts by weight of TiO$_2$ were mixed thereby obtaining a composition in the form of paste. This was coated on the Teflon sheet in the form of film and heated thereby obtaining a 45μ thick film.

80 mol percent of vinyl chloride, 10 mol percent of vinyl acetate and 10 mol percent of acrylic acid were polymerized in methyl ethyl ketone and thereafter, by adding thereto 10 mol percent of glycidyl methacrylate the condensation was conducted by heating thereby producing a solution of a polymer containing an unsaturated bond at its side chain. This solution was admixed with 3 percent, based on the resin in said solution, of zinc chromate. The resulting solution was coated in the thickness of 10μ on the zinc phosphate treated sheet steel and heated to 50°C under reduced pressure thereby removing the methyl ethyl ketone. The said film was covered thereon and irradiated with a dose of 5 Mrads of 0.5 MeV electron beam by means of the Van de Graaff type accelerator thereby causing the film, intermediate resin layer and sheet steel to be unified and a precoated metal was obtained. The properties of the resultant material were shown in Table 11 and it exhibited good results both in processability and in adhesive preperty.

Table 11

| | |
|---|---|
| Pencil hardness | H |
| "Cross hatch"-tape test | 100/100 |
| 108° bend | 1T |
| Salt spray test | No swelling |
| (5% NaCl aqueous solution, 40°C, 200 hrs.) | normal in all other respects |

Example 12

100 parts of an aqueous dispersion containing 30 percent of a vinylidene fluoride having a particle diameter of 1 to 20 μ and 100 parts of a tricresyl phosphate were mixed and this was spray-coated on the chromium plated plate and treated by heating to 95° to 180°C for a total of 30 minutes. A film with a thickness of 25μ was obtained.

A copolymer of 0.8 mol of methyl acrylate and 0.2 mol of acrylic acid was admixed with 0.2 mol of glycidyl methacrylate and the condensation was conducted by heating thereby producing a polymer containing an unsaturated bond at its side chain.

A composition consisting of 100 parts by weight of this polymer, 20 parts by weight of methyl methacrylate and 50 parts by weight of tricresyl phosphate was coated in the thickness of 10μ on the zinc phosphate treated sheet steel and the said film was covered thereon and given a dose of 5 Mrads radiation of 5 Mrads radiation of 0.5 MeV electron beam by means of the Van de Graaff type accelerator. The obtained precoated metal exhibited good adhesive properties and passed the 1 kg × 30 cm. impact test by the Du pont type impact testing apparatus.

Table 12

| | |
|---|---|
| Pencil hardness | H |
| "Cross hatch"-tape test | 100/100 |
| 180° bend | 1T |
| Impact test (1 kg × 50 cm) | pass |
| Salt spray test (500 hrs.) | excellent |

We claim:

1. A process for the production of a precoated metal which comprises coating the surface of a metal plate with a radical curable composition, placing a film composed of a synthetic resin in intimate contact with said radical curable layer and thereafter irradiating said laminated product with an electron beam having an energy of 0.1 to 3 MeV in a dose of 0.1 to 20 Mrad, said radical curable composition comprising a mixture of 30 to 100 percent by weight of at least one unsaturated polymer including 0.1 to 5 equivalents of carbon-carbon double bonds per 1,000 of the molecular weight of said unsaturated polymer and 70 to 0 percent by weight of a vinyl monomer.

2. The process of claim 1 wherein said unsaturated polymer of said radical curable composition is selected from the group consisting of vinyl polymers, polyesters, polyester ethers, melamine polymers and polyamides, and said radical curable composition has a monomer constituent in common with said synthetic resin.

* * * * *